(12) United States Patent
Sato

(10) Patent No.: US 11,073,742 B2
(45) Date of Patent: Jul. 27, 2021

(54) LIGHT AMOUNT ADJUSTING APPARATUS AND OPTICAL APPARATUS

(71) Applicant: CANON KABUSHIKI KAISHA, Tokyo (JP)

(72) Inventor: Katsuhiko Sato, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/888,933

(22) Filed: Jun. 1, 2020

(65) Prior Publication Data
US 2020/0379316 A1    Dec. 3, 2020

(30) Foreign Application Priority Data
Jun. 3, 2019    (JP) .............................. JP2019-103418

(51) Int. Cl.
*G03B 9/06*    (2021.01)

(52) U.S. Cl.
CPC ...................................... *G03B 9/06* (2013.01)

(58) Field of Classification Search
CPC .................................. G03B 9/06; G03B 9/07
USPC ....................................................... 396/510
See application file for complete search history.

(56) References Cited

U.S. PATENT DOCUMENTS

| | | | | |
|---|---|---|---|---|
| 4,264,178 A | * | 4/1981 | Muryoi | G03B 9/06 396/509 |
| 5,884,110 A | * | 3/1999 | Iikawa | G03B 7/095 396/509 |
| 2012/0170096 A1 | * | 7/2012 | Kawamoto | G03B 9/06 359/230 |
| 2012/0321293 A1 | * | 12/2012 | Schauss | G02B 13/006 396/510 |
| 2016/0178989 A1 | * | 6/2016 | Ochi | G02B 7/102 396/510 |
| 2019/0041724 A1 | * | 2/2019 | Nishijima | G02B 5/005 |

FOREIGN PATENT DOCUMENTS

JP    H02121730 U    10/1990

* cited by examiner

*Primary Examiner* — Christopher E Mahoney
(74) *Attorney, Agent, or Firm* — Rossi, Kimms & McDowell LLP

(57) ABSTRACT

A light amount adjusting apparatus includes a base member, light amount adjusting blades configured to form an aperture through which light passes, a blade driving member configured to rotate relative to the base member to drive the light amount adjusting blades, a cam member including a cam attached to the base member and configured to rotate the light amount adjusting blades driven by a rotation of the blade driving member so as to change a size of the aperture, and an adjuster configured to change a mount phase of the cam member relative to the base member in a rotational direction of the blade drive member.

6 Claims, 7 Drawing Sheets

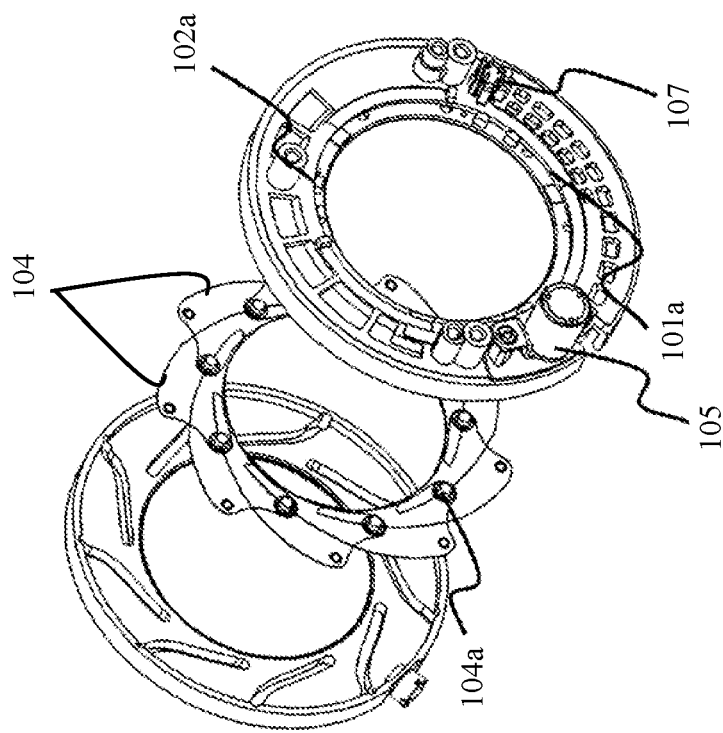
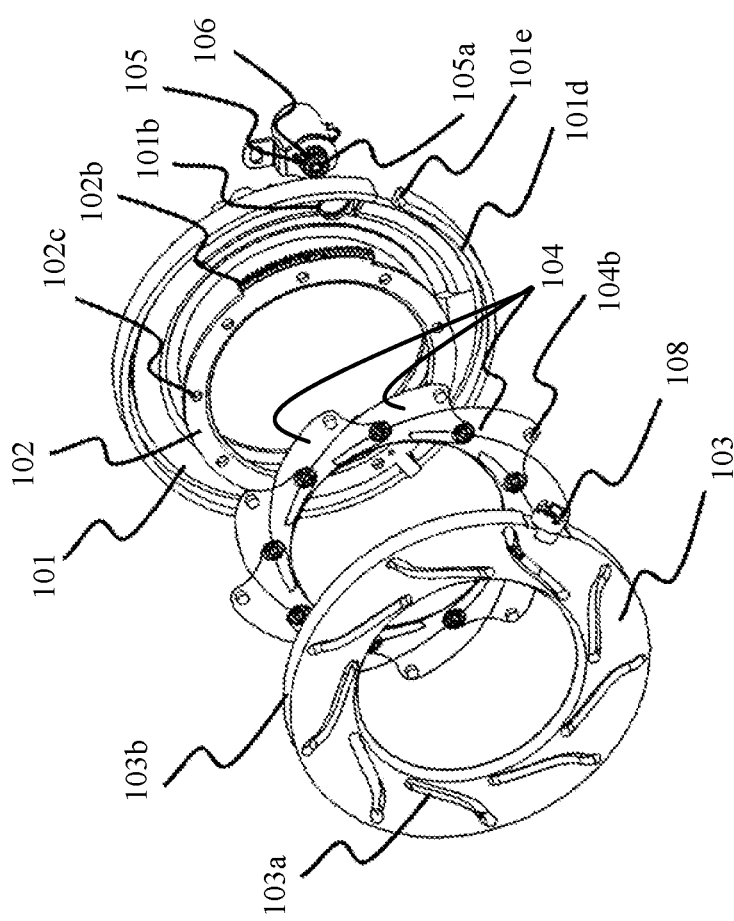
FIG. 2B
FIG. 2A

LIGHT AMOUNT ADJUSTING APPARATUS AND OPTICAL APPARATUS

BACKGROUND OF THE INVENTION

Field of the Invention

The present invention relates to light amount adjusting apparatuses, such as a diaphragm (aperture stop) mounted on an optical apparatus, such as a still camera, a video camera, and an interchangeable lens unit.

Description of the Related Art

One of the above light amount adjusting apparatuses adjusts the light amount by rotating a drive ring around an optical axis of an imaging optical system, and by rotating a plurality of light amount adjusting blades using a cam to change the aperture diameter for transmitting light. When the drive ring is rotated by a stepping motor, the aperture diameter is controlled by making the excitation pattern of the stepping motor and the aperture diameter in the one-to-one correspondence and by inputting the number of driving pulses to the stepping motor which corresponds to each of a plurality of other aperture diameters from the initial aperture diameter (such as opening).

In order to make the excitation pattern corresponding to the initial aperture diameter and the actual initial aperture diameter correspond to each other, a blade position adjustment is required which adjusts a relative positional relationship between a reference pin serving as a rotational reference of the light amount adjusting blade and a cam that rotates the light amount adjusting blade. Japanese Utility-Model Laid-Open No. ("JP") 02-121730 discloses a light amount adjusting apparatus configured to adjust a blade position by rotating a cam member for rotating the light amount adjusting blade around a center of a light transmitting opening relative to a rotational reference position of the light amount adjusting blade.

However, when the blade position is adjusted by rotating the cam member as disclosed in the light amount adjusting apparatus disclosed in JP 02-121730, the light amount adjusting blade may be excessively rotated by a slight rotation of the cam member, and the adjustment is not easy.

SUMMARY OF THE INVENTION

The present invention provides a light amount adjusting apparatus that is easily adjustable, and an optical apparatus having the same.

A light amount adjusting apparatus according to one aspect of the present invention includes a base member, light amount adjusting blades configured to form an aperture through which light passes, a blade driving member configured to rotate relative to the base member to drive the light amount adjusting blades, a cam member including a cam attached to the base member and configured to rotate the light amount adjusting blades driven by a rotation of the blade driving member so as to change a size of the aperture, and an adjuster configured to change a mount phase of the cam member relative to the base member in a rotational direction of the blade drive member.

An optical apparatus including the above light amount adjusting apparatus also constitutes another aspect of the present invention.

Further features of the present invention will become apparent from the following description of exemplary embodiments with reference to the attached drawings.

BRIEF DESCRIPTION OF THE DRAWINGS

FIGS. 2A and 2B are exploded perspective views showing a structure of the diaphragm unit according to the first embodiment.

DESCRIPTION OF THE EMBODIMENTS

Referring now to the accompanying drawings, a description will be given of embodiments according to the present invention.

First Embodiment

Figure 8:
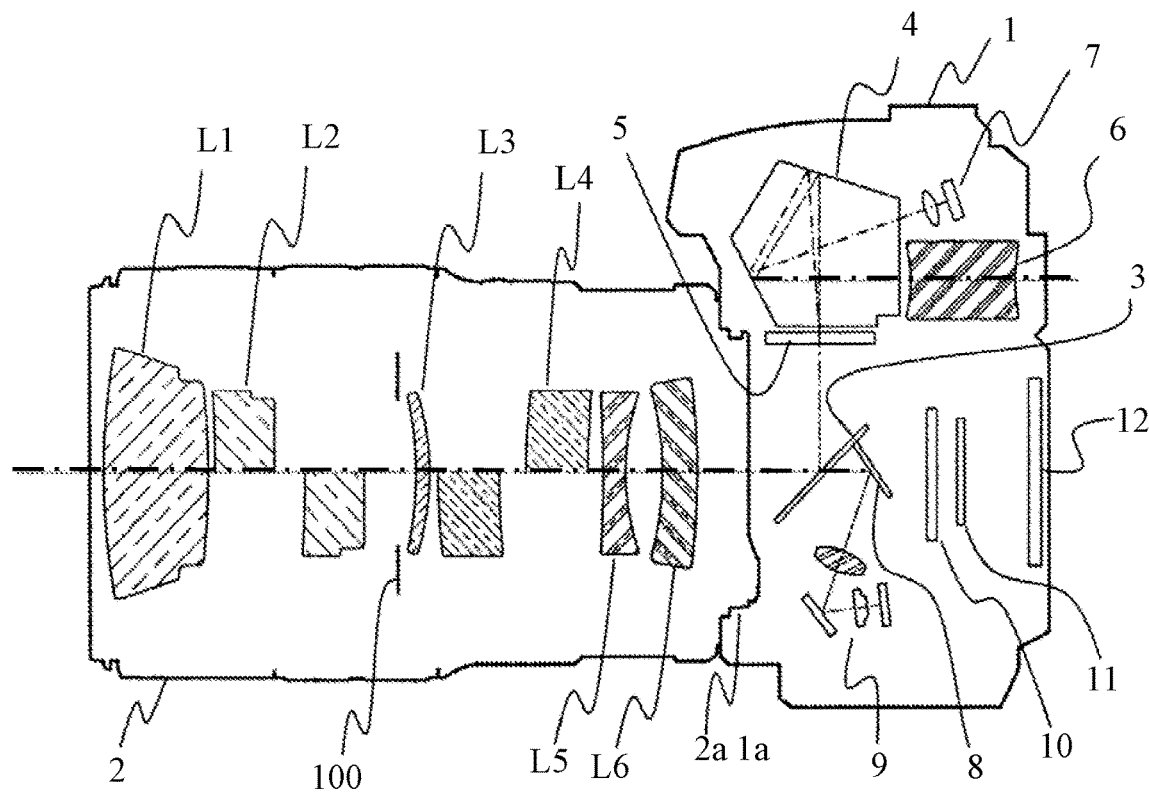
FIG. 8 illustrates a structure of a camera system including an interchangeable lens unit mounted with the diaphragm unit according to each embodiment.

FIG. 8 illustrates a camera system that includes an interchangeable lens unit 2 serving as an optical apparatus mounted with a diaphragm unit (aperture stop unit) as a light amount adjusting apparatus according to a first embodiment of the present invention and a single-lens reflex digital camera 1 mounted with the interchangeable lens unit. Herein, an interchangeable lens unit for a camera will be described as an optical apparatus, but the optical apparatus may be a lens integrated camera or one for a purpose other than imaging, such as a projection lens unit for a projector. A video camera and a film-based camera may be used instead of the single-lens reflex digital camera.

A camera mount 1a provided on a camera body 1 and a lens mount 2a provided on the interchangeable lens unit 2 are mechanically detachably connected to each other by a bayonet mechanism. The camera body 1 and the interchangeable lens unit 2 are electrically connected with each other via the camera mount 1a and the lens mount 2a, and can communicate with each other.

The camera body 1 includes a main mirror 3, a pentaprism 4, a focus plate 5, a finder (viewfinder) lens 6, a photometric unit (light metering unit) 7, a sub mirror 8, a focus detecting unit 9, a shutter 10, an image sensor (image pickup element) 11, and a display panel 12. The interchangeable lens unit 2 includes an imaging optical system (image pickup optical system) that includes, in order from the object side to the image side (from the left side to the right side in the figure), a first lens unit L1, a second lens unit L2, a diaphragm unit 100, a third lens unit L3, a fourth lens unit L4, a fifth lens unit L5, and a sixth lens unit L6. The second lens unit L2 and the fourth lens unit L4 move in the direction in which the optical axis of the imaging optical system extends (optical axis direction) during focusing.

Part of the light beam that has passed through the imaging optical system is reflected by the main mirror 3 disposed in the optical path and forms an object image on the focus plate 5. The object image is converted into an erect image by the pentaprism 4 and is observed by the user through the finder lens 6. The photometric unit 7 detects the luminance of the object image on the focus plate 5.

A light flux transmitting through the main mirror 3 after the imaging optical system is reflected by the sub mirror 8 and guided to the focus detecting unit 9. The focus detecting unit 9 performs a focus detection by a phase difference detection method. While the main mirror 3 and the sub mirror 8 are retracted out of the optical path, the image sensor 11 photoelectrically converts (captures) an object image formed by the light beam that has passed through the imaging optical system and the shutter 10. The display panel 12 displays image data obtained by imaging and various imaging information.

The diaphragm unit 100 drives a plurality of diaphragm blades (light amount adjusting blades) in response to a manual operation of a user or in response to a command from the camera body 1, and adjusts a light amount reaching the image sensor 11 by changing the diaphragm aperture size through which light passes (referred to as a diameter hereinafter).

Figure 1:
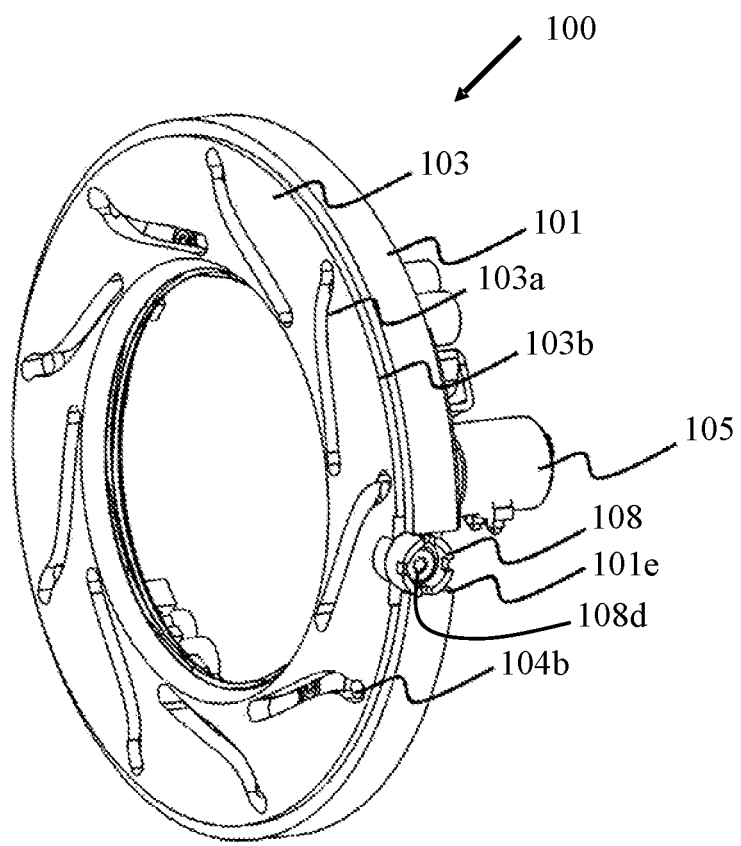
FIG. 1 illustrates a configuration of a diaphragm unit according to a first embodiment of the present invention.

FIGS. 1, 2A, and 2B illustrate the structure of the diaphragm unit 100. FIG. 1 illustrates the appearance of the diaphragm unit 100. FIGS. 2A and 2B illustrate the exploded diaphragm unit 100. FIG. 1 illustrates the appearance of the diaphragm unit 100 when viewed from the object side, FIGS. 2A and 2B illustrate the exploded views of the diaphragm unit 100 when viewed from the object side (FIG. 2A) and the image side (FIG. 2B). The diaphragm 100 may be used in the opposite direction to the present embodiment. In other words, FIG. 1 may illustrate the appearance of the diaphragm unit 100 when viewed from the image side. The same applies to FIGS. 2A and 2B.

Reference numeral 101 denotes a diaphragm base plate as a base member, and reference numeral 102 denotes a diaphragm drive ring as a blade driving member. Reference numeral 103 denotes a cam plate as a cam member, and reference numeral 104 denotes diaphragm blades as a plurality of (nine) light amount adjusting blades. Reference numeral 105 denotes a stepping motor as a driver (actuator). Reference numeral 105a denotes an output shaft of the stepping motor 105, and reference numeral 105b denotes a bearing that rotatably supports the output shaft 105a.

The diaphragm base plate 101 has a circular opening 101a where the optical axis of the imaging optical system passes the center. A radial engagement portion 102a of the diaphragm drive ring 102 is fit in (engaged with) the inner periphery of the opening 101a rotatably around the optical axis. The diaphragm base plate 101 has a bearing reference hole 101b provided outside the opening 101a. The stepping motor 105 in which the bearing 105b is inserted into the bearing reference hole 101b is fixed to the diaphragm base plate 101 by screws. Thereby, the output shaft 105a of the stepping motor 105 is located at a predetermined position.

Reference numeral 106 denotes a pinion gear as a drive gear integrally rotatably fixed onto the output shaft 105a. Reference numeral 102b denotes a ring gear provided on the outer circumferential portion of the diaphragm drive ring 102 and serves as a driven gear engaged with the pinion gear 106. The diaphragm drive ring 102 is rotated by receiving the rotational driving force of the stepping motor 105 via the pinion gear 106 and the ring gear 102b.

Reference numeral 107 denotes an opening switch that detects that the diaphragm drive ring 102 is located at an open position (a position corresponding to an open aperture) which is a rotational reference position.

The diaphragm drive ring 102 and the nine light amount adjusting blades 104 are housed between the diaphragm base plate 101 and the cam plate 103. Each diaphragm blade 104 has a rotating pin 104a and a cam pin 104b. The diaphragm drive ring 102 has holes 102c in each of which the rotation pin 104a is rotatably fitted, at nine locations arranged at regular intervals in the rotational direction of the diaphragm drive ring 102 (referred to as a circumferential direction hereinafter). The cam plate 103 has nine cam grooves 103a in which the cam pins 104b are rotatably fitted, at regular intervals in the circumferential direction.

As the diaphragm drive ring 102 is rotated, nine diaphragm blades 104 are driven in the circumferential direction via the rotating pins 104a. At this time, as the phase (rotational position in the circumferential direction) of the diaphragm drive ring 102 relative to the cam plate 103 changes, the nine diaphragm blades 104 rotate as the cam pins 104b move along the cam grooves 103a and rotate around the pins 104a. Thereby, the diaphragm aperture diameter formed by the nine diaphragm blades 104 is changed.

A radial engagement portion 103b is provided on an outer periphery of the cam plate 103. The radial engagement portion 103b is rotatably lightly press-fit or fit into a radial engagement portion 101d provided on an inner periphery near the outer periphery of the diaphragm base plate 101. In other words, the cam plate 103 is rotatably supported around the opening 101a in the diaphragm base plate 101. The cam plate 103 may be rotatably coupled to the diaphragm base plate 101 by a bayonet structure.

An adjustment member receiver 103c is provided on part of the outer periphery of the cam plate 103. A phase adjusting member 108 as an adjuster is attached to the adjusting member receiver 103c by screws 108d. The phase adjusting member 108 is a member capable of changing a mount phase of the cam plate 103 onto the diaphragm base plate 101, and will be described later in detail.

On the other hand, an engagement portion 101e with which the phase adjusting member 108 is engaged (lightly press-fit or fit) is provided on part of the outer periphery of the diaphragm base plate 101.

Figure 3:
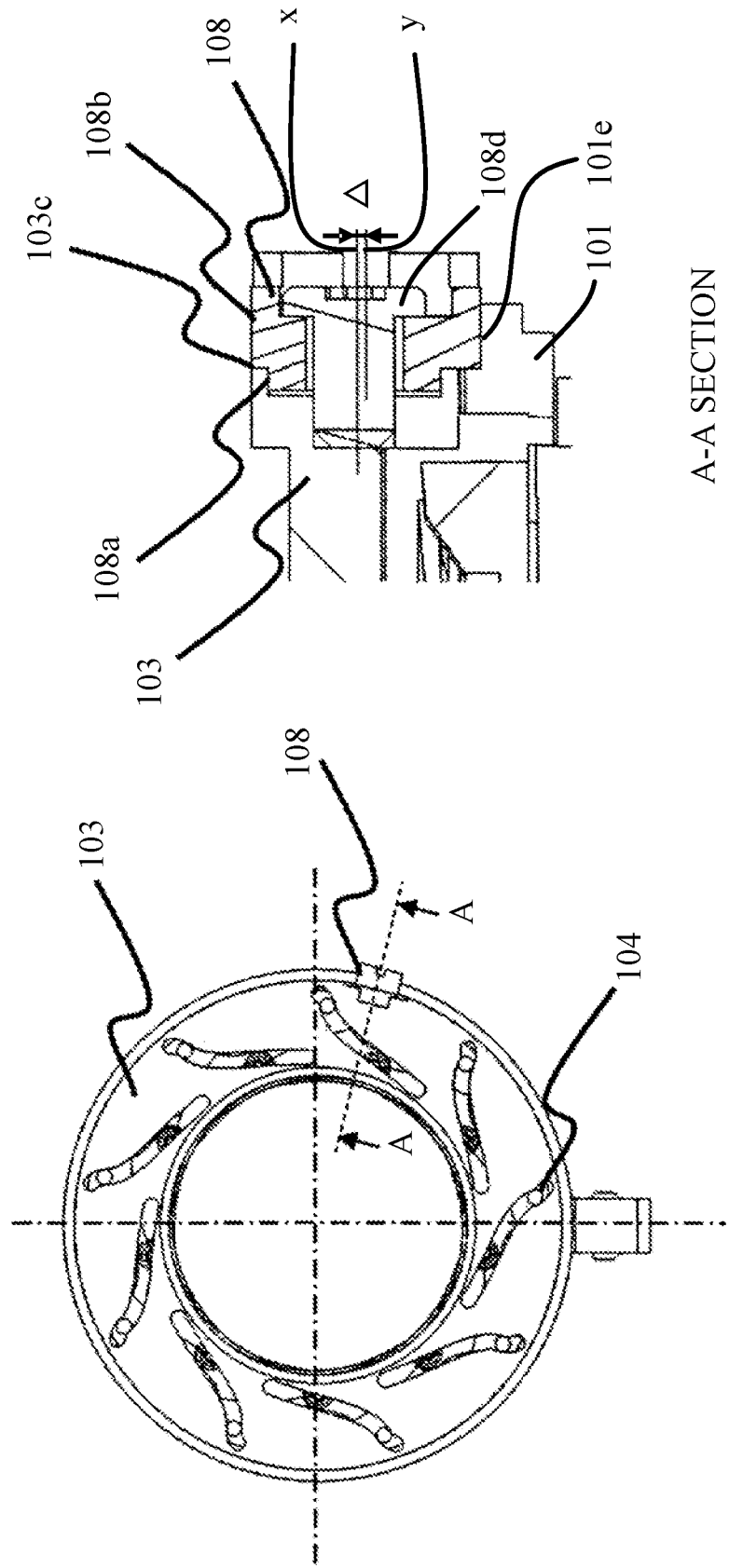
FIG. 3 illustrates an adjustment mechanism in the diaphragm unit according to the first embodiment.

A left view in FIG. 3 illustrates the diaphragm unit 100 viewed from the object side, and a right view illustrates an enlarged section taken along a line A-A in the left view. The phase adjusting member 108 has an eccentric roller shape. A center axis x of the radial engagement portion (first part) 108a of the phase adjusting member 108 which is fit in the adjusting member receiver 103c of the cam plate 103 and a center axis y of the radial contact (second part) 108b which contacts the engagement portion 101e of the diaphragm base plate 101 are eccentric to each other. The center axes x and y extend in the radial direction of the diaphragm unit 100 (the direction orthogonal to the optical axis). The eccentricity amount of the central axis y to the central axis x is defined as Δ.

A cleavage line portion 108c is provided at the tip of the phase adjusting member 108, and the phase adjusting member 108 can be rotated around a central axis (rotation center axis) x by engaging a jig such as a driver with the cleavage line portion 108c. Since the phase adjusting member 108 has the eccentric roller shape as described above, the mount phase of the cam plate 103 relative to the diaphragm base plate 101 can be changed by rotating the phase adjusting member 108. When the mount phase of the cam plate 103 is changed relative to the diaphragm base plate 101, the phase of the cam plate 103 is also changed relative to the diaphragm drive ring 102 located at the open position. By changing (adjusting) the mount phase of the cam plate 103 in this manner, the diaphragm aperture diameter formed by the nine diaphragm blades 104 can be adjusted for each rotational position of the diaphragm drive ring 102.

Figure 4C:
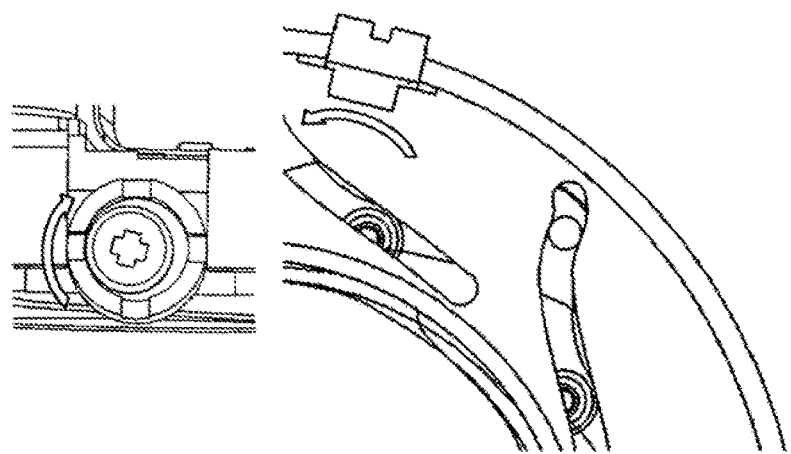
FIGS. 4A to 4C illustrate an adjustment of the diaphragm unit according to the first embodiment.
Figure 4B:
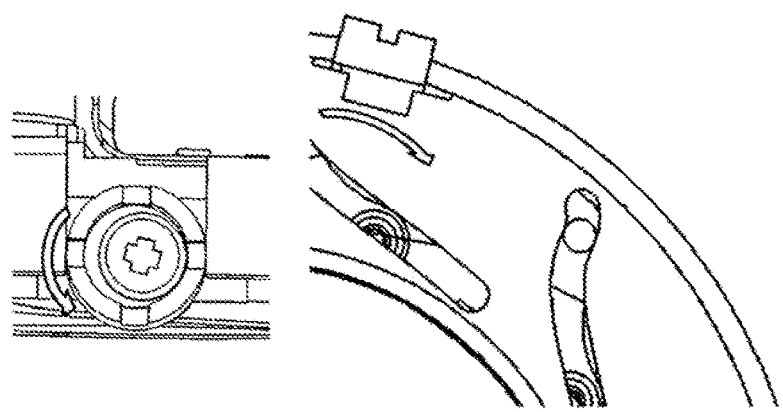
Figure 4A:
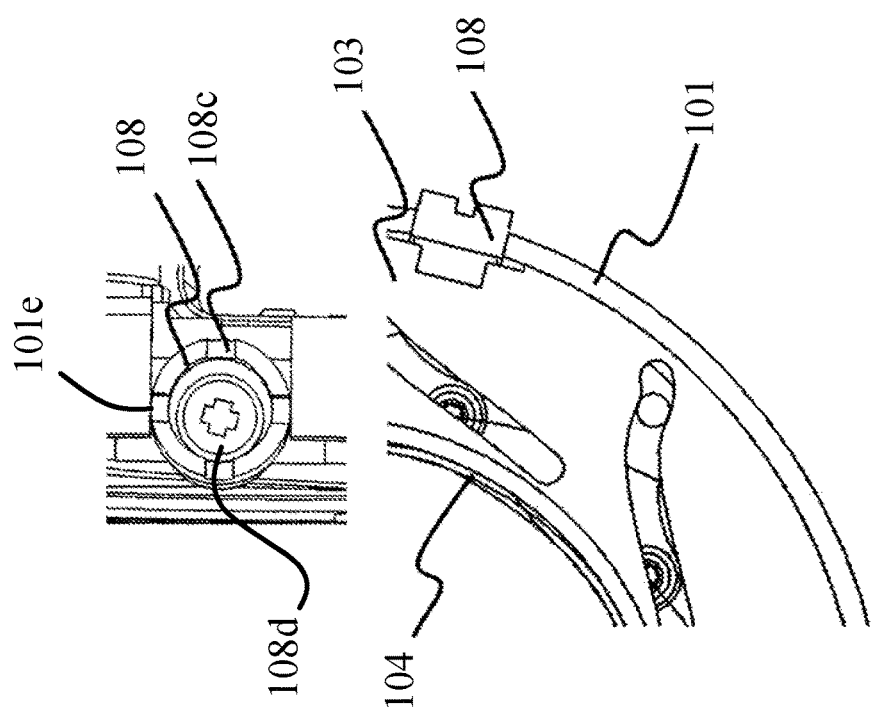

FIGS. 4A to 4C illustrate the adjustment of the mount phase of the cam plate 103 by the phase adjusting member 108. By rotating the phase adjusting member 108 in the counterclockwise direction from the state illustrated in FIG. 4A as illustrated in FIG. 4B, the diaphragm aperture diameter can be adjusted to a side where the diaphragm aperture diameter increases (the light amount increases) according to the rotational amount. By rotating the phase adjusting member 108 in the clockwise direction as illustrated in FIG. 4C, the diaphragm aperture diameter can be adjusted to a side where the diaphragm aperture diameter decreases (the light amount decreases) according to the rotational amount.

The rotational amount of the cam plate 103 relative to the rotational amount of the phase adjusting member 108 (also referred to as an adjustment sensitivity hereinafter) can be reduced by setting the eccentricity amount A of the phase adjusting member 108 so that, for example, the phase adjusting member 108 can be rotated by 90° when the mount phase of the cam plate 103 is changed by 1° relative to the diaphragm base plate 101. Thereby, the mount phase of the cam plate 103 can be easily adjusted.

The jig for rotating the phase adjusting member 108 having the central axis x extending in the radial direction of the diaphragm unit 100 can access the phase adjusting member 108 from the outside in the radial direction. Therefore, in an adjustment while the light amount transmitting the diaphragm aperture is confirmed, the jig or the hand of the worker holding the jig can rotate the phase adjusting member 108 so as not to block the light transmitting the diaphragm aperture. The central axis x of the phase adjusting member 108 does not have to extend in the radial direction of the diaphragm unit 100 (the direction orthogonal to the optical axis), and may intersect with the direction in which the optical axis extends (or the light passing direction).

After the above adjustment is completed, the cam plate 103 and the diaphragm base plate 101 may be fixed by bonding, or the phase adjusting member 108 may be fixed onto the drawing base plate 101 by bonding.

Part of the phase adjusting member which is coaxial with the center axis x may be rotatably held by the diaphragm base plate 101, and the eccentric part may contact the cam plate 103.

Second Embodiment

Figure 5:
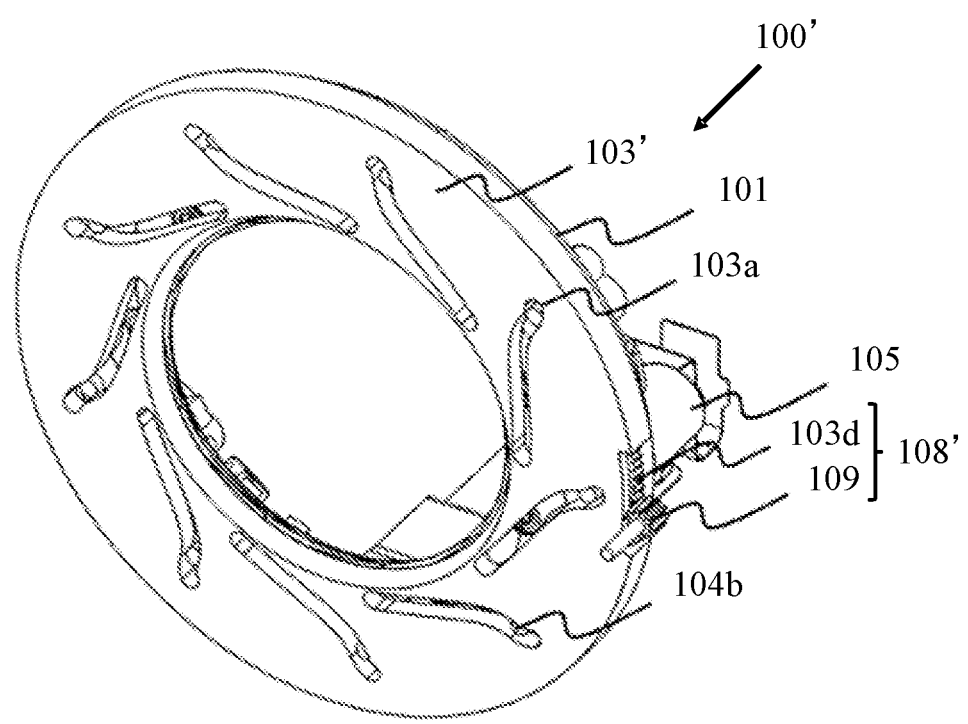
FIG. 5 illustrates a structure of a diaphragm unit according to a second embodiment of the present invention.

FIG. 5 illustrates a diaphragm unit 100' according to a second embodiment of the present invention. In this embodiment, a gear 103d is provided on the outer periphery of the cam plate 103'. The gear 103d is engaged with a jig gear 109. The gear 103d forms a phase adjusting mechanism 108' together with the jig gear 109.

As the jig gear 109 rotates, the rotation is reduced through the gear 103d and transmitted to the cam plate 103'. Thereby, the cam plate 103' rotates around the center of the opening 101a of the diaphragm base plate 101, and the relative phase changes between the cam plate 103' and the diaphragm base plate 101. At this time, the larger the deceleration ratio of the gear 103d is relative to the jig gear 109, the lower the above adjustment sensitivity can be made.

Figures 6A, 6B, 6C:
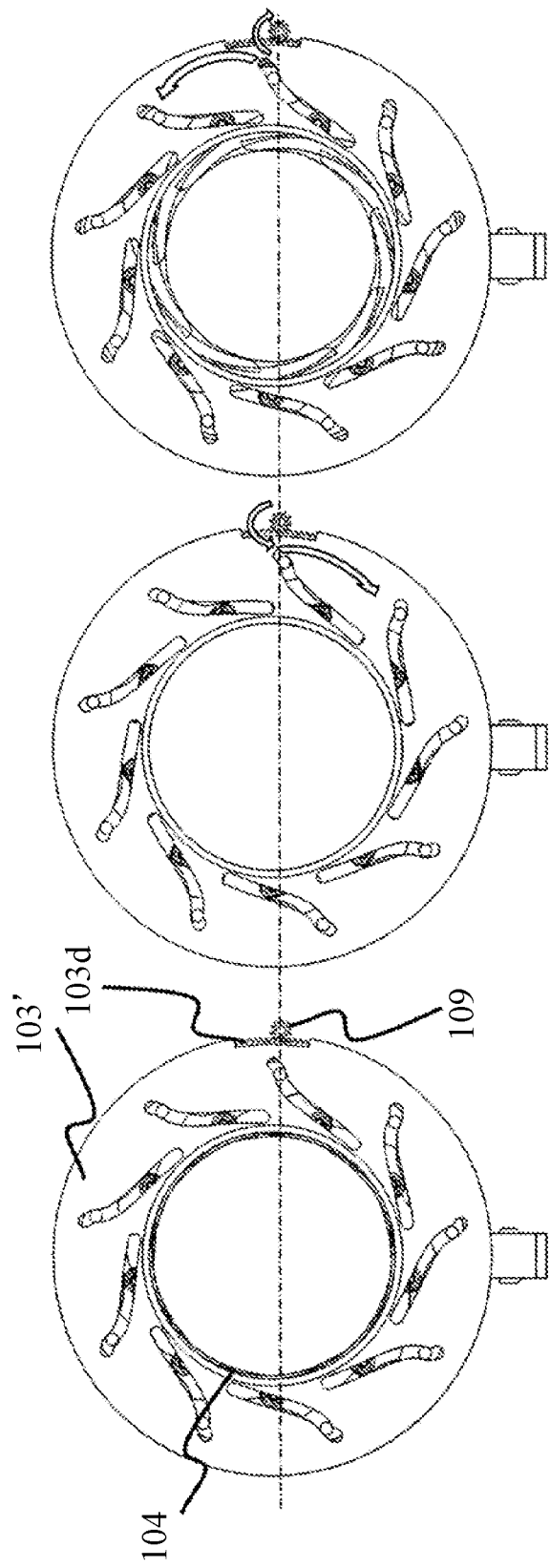
FIGS. 6A to 6C illustrates an adjustment method in the diaphragm unit according to the second embodiment.

FIGS. 6A to 6C illustrate the adjustment of the mount phase of the cam plate 103' by the phase adjusting mechanism 108'. When the jig gear 109 is rotated in the counterclockwise direction from the state illustrated in FIG. 6A as illustrated in FIG. 6B, the cam plate 103' rotates in the clockwise direction. Thereby, the diaphragm aperture diameter can be adjusted so that it becomes larger (the light amount increases) in accordance with the rotational amount of the jig gear 109. When the jig gear 109 is rotated in the clockwise direction as illustrated in FIG. 6C, the cam plate 103' rotates in the counterclockwise direction. Thereby, the diaphragm aperture diameter can be adjusted so that it becomes smaller (the light amount decreases) in accordance with the rotational amount of the jig gear 109. After the adjustment is completed, the jig gear 109 is removed.

Instead of the jig gear 109 and the gear 103d, a rotatable roller and a frictional material provided on a cam plate so that the roller does not slip easily may be used.

Third Embodiment

Figure 7:
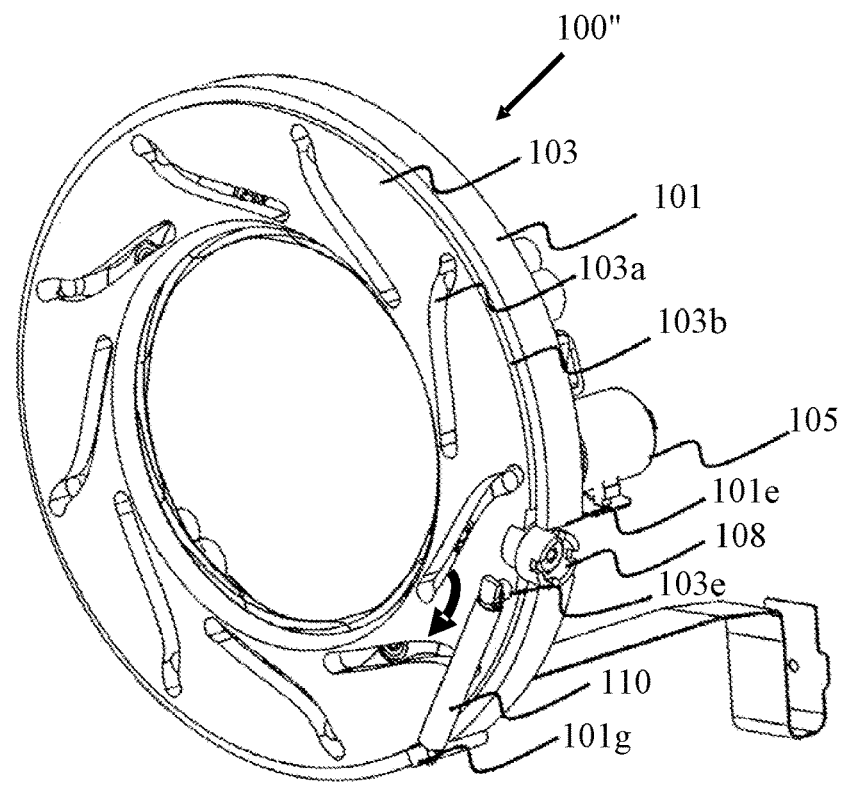
FIG. 7 illustrates a structure of a diaphragm unit according to a third embodiment of the present invention.

FIG. 7 illustrates a diaphragm unit 100" according to a third embodiment of the present invention. This embodiment is a variation of the first embodiment, and those components common to those of the first embodiment will be designated by the same reference numerals as those of the first embodiment.

In the diaphragm unit 100", similarly to the first embodiment, the cam plate 103 is supported so that the radial engagement portion 103b on its outer periphery is rotatably lightly press-fit or fit in the radial engagement portion 101d provided on the inner periphery near the outer periphery of the diaphragm base plate 101. Both ends of a spring 110 is engaged with a first hook 101g provided on part of the diaphragm base plate 101 in the circumferential direction and a second hook 103e provided on part of the cam plate 103 in the circumferential direction. The cam plate 103 is biased to one side in the circumferential direction relative to the diaphragm base plate 101 by the biasing force of the spring 110, as indicated by an arrow in the figure. Thereby, the adjusting member 108 (radial contact 108b) fit in and held by the adjusting member receiver 103c of the cam plate 103 can be put aside to one side toward the engaging portion 101e of the diaphragm base plate 101 so as to eliminate the play between them. As a result, the mount phase of the cam plate 103 can be prevented from changing the diaphragm base plate 101. Since the engagement portion 101e always contacts the phase adjusting member 108, the phase adjusting member 108 can be easily adjusted without being affected by the play between the adjusting member 108 and the engagement portion 101e.

The first hook 101g provided on the diaphragm base plate 101 may be provided on a fixed member that holds the diaphragm unit 100" in the interchangeable lens unit 2, and the cam plate 103 may be biased to one side in the circumferential direction.

The above embodiment can easily adjust the mount phase of the cam member relative to the base member or the aperture size formed by the light amount adjusting blades relative to the rotational position of the blade driving member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103418, filed on Jun. 3, 2019, which is hereby incorporated by reference herein in its entirety.

What is claimed is:

1. A light amount adjusting apparatus comprising:
a base member;
light amount adjusting blades configured to form an aperture through which light passes;
a blade driving member configured to rotate relative to the base member to drive the light amount adjusting blades;
a cam member, including a cam groove, attached to the base member so as to be fixed to the base member when the blade driving member rotates, and configured to rotate the light amount adjusting blades driven by a rotation of the blade driving member to change a size of the aperture; and
an adjuster configured to change a mount phase of the cam member relative to the base member in a rotational direction of the blade drive member,
wherein the adjuster rotates to change the mount phase.

2. The light amount adjusting apparatus according to claim 1, wherein:
the adjuster includes:
a first part rotatably held by one of the base member or the cam member; and
a second part eccentric to the first part and contacting the other of the base member or the cam member, and
the adjuster serves as an adjusting member that rotates to change the mount phase.

3. The light amount adjusting apparatus according to claim 2, wherein the adjusting member extends in a direction whose rotational center axis intersects with a light passing direction.

4. The light amount adjusting apparatus according to claim 1, wherein the adjuster includes a gear provided on the cam member, and the mount phase is changed by rotating a jig gear engaged with the gear.

5. The light amount adjusting apparatus according to claim 1, further comprising a biasing unit configured to bias the cam member to one side in the rotational direction relative to the base member.

6. An optical apparatus comprising:
a lens; and
a light amount adjusting apparatus including:
a base member;
light amount adjusting blades configured to form an aperture through which light passes;
a blade driving member configured to rotate relative to the base member to drive the light amount adjusting blades;
a cam member, including a cam groove, attached to the base member so as to be fixed to the base member when the blade driving member rotates, and configured to rotate the light amount adjusting blades driven by a rotation of the blade driving member to change a size of the aperture; and
an adjuster configured to change a mount phase of the cam member relative to the base member in a rotational direction of the blade drive member,
wherein the adjuster rotates to change the mount phase.

* * * * *